United States Patent
Guo et al.

(10) Patent No.: US 11,316,630 B2
(45) Date of Patent: Apr. 26, 2022

(54) INTERNET OF THINGS-BASED COMMUNICATION METHOD AND APPARATUS

(71) Applicant: HUAWEI TECHNOLOGIES CO., LTD., Guangdong (CN)

(72) Inventors: Yuchen Guo, Shenzhen (CN); Chenyu Huang, Hong Kong (CN); Qian Zhang, Hong Kong (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/007,424

(22) Filed: Aug. 31, 2020

(65) Prior Publication Data
US 2020/0403744 A1    Dec. 24, 2020

Related U.S. Application Data

(63) Continuation of application No. PCT/CN2018/117524, filed on Nov. 26, 2018.

(30) Foreign Application Priority Data

Mar. 2, 2018    (CN) .......................... 201810175072.8

(51) Int. Cl.
*G06F 11/00* (2006.01)
*H04L 5/00* (2006.01)
(Continued)

(52) U.S. Cl.
CPC ............ *H04L 5/0035* (2013.01); *G16Y 30/00* (2020.01); *H04B 17/318* (2015.01); *H04W 52/0212* (2013.01)

(58) Field of Classification Search
CPC ..... H04L 47/10; H04L 43/50; H04L 12/2697; H04L 12/5602; H04L 2012/5936;
(Continued)

(56) References Cited

U.S. PATENT DOCUMENTS

2005/0266848 A1    12/2005  Kim
2016/0212702 A1*    7/2016  Ghosh ................... H04L 5/0053
(Continued)

FOREIGN PATENT DOCUMENTS

CN          1951036 A       4/2007
CN        101036405 A       9/2007
(Continued)

OTHER PUBLICATIONS

IEEE P802.11ax/D2.0, Part 11: "Wireless LAN Medium Access Control (MAC) and Physical Layer (PHY) Specifications" Amendment 6: Enhancements for High Efficiency WLAN, Oct. 2017. total 596 pages.
(Continued)

*Primary Examiner* — Chuong T Ho

(57) ABSTRACT

Embodiments of the present disclosure provide an internet of things-based communication method, which applied to the field of communications technologies to resolve a problem of a short battery life of an internet of things device caused by frequent movement of an internet of things device. The method includes: receiving, by a second access point, a data packet from an internet of things device, where the data packet carries an identifier of an access point coordinating cluster; and sending, by the second access point, a first acknowledgment message to the internet of things device; or sending, by the second access point to a first access point, the data packet and signal strength of the data packet received by the second access point.

20 Claims, 10 Drawing Sheets

(51) Int. Cl.
*H04B 17/318* (2015.01)
*G16Y 30/00* (2020.01)
*H04W 52/02* (2009.01)

(58) Field of Classification Search
CPC ......... H04L 41/12; H04L 45/02; H04L 45/00; H04Q 11/0478
USPC .......................................... 370/252, 253, 254
See application file for complete search history.

(56) References Cited

U.S. PATENT DOCUMENTS

| | | | |
|---|---|---|---|
| 2017/0063999 A1* | 3/2017 | Adrangi | H04W 4/70 |
| 2017/0156104 A1 | 6/2017 | Grandhi et al. | |
| 2017/0188242 A1* | 6/2017 | Ghosh | H04W 24/08 |
| 2018/0126432 A1* | 5/2018 | Tsai | B23B 25/00 |
| 2018/0192425 A1* | 7/2018 | Yeh | H04W 72/0413 |
| 2018/0249401 A1* | 8/2018 | Zhou | H04W 24/02 |
| 2019/0223257 A1* | 7/2019 | Han | H04W 88/08 |

FOREIGN PATENT DOCUMENTS

| | | |
|---|---|---|
| CN | 101217785 A | 7/2008 |
| CN | 103259878 A | 8/2013 |
| CN | 103298064 A | 9/2013 |
| CN | 104023312 A | 9/2014 |
| CN | 104902537 A | 9/2015 |
| CN | 107040356 A | 8/2017 |
| WO | 2010059750 A1 | 5/2010 |

OTHER PUBLICATIONS

IEEE Std 802.11-2016 (Revision of IEEE Std 802.11-2012), Part 11: "Wireless LAN Medium Access Control (MAC) and Physical Layer (PHY) Specifications", IEEE Computer Society,S ponsored by the LAN/MAN Standards Committee, total 3534 pages.
Huawei, Introduction of NB-IoT, 3GPP TSG-RAN WG2 Meeting #93, R2-162068, St Julian's, Malta, Feb. 15-19, 2016, 289 pages.
Office Action issued in CN 201810175072.8, dated Jun. 24, 2021, 7 pages.

* cited by examiner

INTERNET OF THINGS-BASED COMMUNICATION METHOD AND APPARATUS

CROSS-REFERENCE TO RELATED APPLICATIONS

This application is a continuation of International Application No. PCT/CN2018/117524, filed on Nov. 26, 2018, which claims priority to Chinese Patent Application No. 201810175072.8, filed on Mar. 2, 2018. The disclosures of the aforementioned applications are hereby incorporated by reference in their entireties.

TECHNICAL FIELD

This application relates to the field of communications technologies, and in particular, to an internet of things-based communication method and an apparatus.

BACKGROUND

An internet of things (IoT) is an enormous network that is integrated with the Internet and that collects, in real time by using various information sensing devices, various required information about an object or a process that needs to be monitored or connected or that needs to interact with. In recent years, internet of things devices have been widely applied to daily life and production. For example, an internet of things device is attached to an article to track the article, for example, during luggage monitoring in an airport or monitoring of a product on a production line of a factory.

Because of mobility of an internet of things device, after being associated with an access point (AP), the internet of things device may move out of a signal coverage area of the AP, and is therefore disconnected from the AP. Then the internet of things device may send a probe request message to search for a new AP, and can be associated with a new AP after receiving a probe response message from the new AP. However, when the internet of things device moves frequently, the internet of things device needs to send a probe request message frequently to switch an associated AP. This consumes massive electric power, thereby affecting a battery life of the internet of things device.

SUMMARY

Embodiments of this application provide an internet of things-based communication method and an apparatus, to resolve a problem of a short battery life of an internet of things device caused by frequent movement.

According to a first aspect, an embodiment of this application provides an internet of things-based communication method. The method includes: receiving, by a second access point, a data packet from an internet of things device, where the data packet carries an identifier of an access point coordinating cluster; and then sending, by the second access point, an acknowledgment message to the internet of things device; or sending, by the second access point to a first access point, the data packet and signal strength of the data packet received by the second access point. The access point coordinating cluster includes at least the first access point and the second access point, and the first access point is an access point with which the internet of things device is initially associated. According to this method, after the internet of things device moves out of a coverage area of the initially associated first access point, the second access point that belongs to the same coordinating cluster as the first access point can reply, in place of the first access point, to the internet of things device with the acknowledgment message; or the second access point may forward, to the first access point, the data packet from the internet of things device, thereby ensuring that the data packet sent in a movement process of the internet of things device can be processed in a timely manner, to avoid data transmission interruption. In addition, after moving out of the coverage area of the first access point, the internet of things device does not need to send a probe request and associate with a new access point. This can reduce signaling overheads and reduce power consumption of the internet of things device, thereby improving a battery life of the internet of things device.

Optionally, the acknowledgement message may be referred as an ACK message for short, and the signal strength of the data packet may be represented by using a Received Signal Strength Indicator (RSSI).

In a possible implementation, before the sending, by the second access point, an acknowledgment message to the internet of things device, the second access point may receive the data packet from each of other access points in the access point coordinating cluster and signal strength of the data packet received by the access point.

Optionally, the second access point may decrypt a data packet by using a shared key of the coordinating cluster to which the second access point belongs.

In a possible implementation, the sending, by the second access point, an acknowledgment message to the internet of things device may be specifically implemented as follows: If the second access point determines that the signal strength of the data packet received by the second access point is greater than the signal strength of the data packet received by each of the other access points in the access point coordinating cluster, sending, by the second access point, the acknowledgment message to the internet of things device. According to this method, if the data packet received by the second access point in the access point coordinating cluster has the greatest signal strength, it indicates that quality of communication between the second access point in the access point coordinating cluster and the internet of things device is the best. The second access point sends, in place of the first access point, the acknowledgment message to the internet of things device, to avoid data transmission interruption. In addition, the second access point can assist the first access point in communicating with the internet of things device, so that the internet of things device does not need to frequently switch an associated access point, thereby reducing power consumption and improving the battery life of the internet of things device.

In a possible implementation, after the second access point sends, to a first access point, the data packet and a signal strength of the data packet received by the second access point, the second access point receives instruction information from the first access point, where the instruction information is used to instruct the second access point to reply with the acknowledgment message. Then the second access point sends the acknowledgment message to the internet of things device. According to this method, the second access point may assist, based on the instruction information from the first access point, the first access point in sending the acknowledgment message to the internet of things device. In this way, the internet of things device can still receive the acknowledgment message without a need to be associated with a new access point. This can avoid power consumption caused by frequent switchover between access points, thereby improving the battery life of the internet of things device.

Optionally, a delay is caused when the data packet sent by the internet of things device to the first access point is forwarded by the second access point. In a process in which the first access point is initially associated with the internet of things device, the first access point may set, for the internet of things device, a delay between sending of the data packet and receiving of the acknowledgment message. In a time period corresponding to the delay, the internet of things device may stay in a sleep mode.

In a possible implementation, after the receiving, by a second access point, a data packet from an internet of things device, the second access point may receive a block acknowledgment request (BAR) message from the internet of things device.

Optionally, the BAR message carries indication information, where the indication information is used to indicate a type of an acknowledgment message requested to be obtained, where the type of an acknowledgment message requested to be obtained may be BA or ACK.

In a possible implementation, the acknowledgment message is a BA message or an ACK message.

According to a second aspect, an embodiment of this application provides an internet of things-based communication method. The method includes: receiving, by a second access point, first indication information from a first access point, where the first indication information is used to indicate whether each internet of things device served by an access point coordinating cluster has to-be-received downlink data; and sending, by the second access point, the first indication information to the internet of things device. The access point coordinating cluster includes at least the first access point and the second access point, and the first access point is an access point with which the internet of things device is initially associated. According to this method, after the internet of things device moves out of a coverage area of the initially associated first access point, if the first access point needs to send downlink data to the internet of things device, the first access point may notify the internet of things device through the second access point that there is to-be-received downlink data, to avoid a problem of data transmission interruption caused because the first access point cannot communicate directly with the internet of things device. In addition, the internet of things device does not need to send a probe request and associate with a new access point. This can reduce signaling overheads and reduce power consumption of the internet of things device, thereby improving a battery life of the internet of things device.

In a possible implementation, after the sending, by the second access point, the first indication information to the internet of things device, the second access point receives a power saving polling frame from the internet of things device, and then the second access point sends, to the first access point, the power saving polling frame and signal strength of the power saving polling frame received by the second access point, and sends an acknowledgment message to the internet of things device.

Optionally, the power saving polling frame is referred as a PS-Poll frame for short, and the signal strength is represented by using an RSSI.

In a possible implementation, after the second access point sends the power saving polling frame and the signal strength of the power saving polling frame received by the second access point to the first access point, the second access point receives second instruction information from the first access point, where the second instruction information is used to instruct the second access point to send the downlink data to the internet of things device.

According to a third aspect, an embodiment of this application provides an internet of things-based communication method. The method includes: receiving, by a first access point from each access point in an access point coordinating cluster, a data packet and signal strength of the data packet received by the access point; and sending, by the first access point, instruction information to a second access point, where the instruction information is used to instruct the second access point to send back an acknowledgment message to an internet of things device. The access point coordinating cluster includes at least the first access point and the second access point, and the first access point is an access point with which the internet of things device is initially associated. According to this method, after the internet of things device moves out of a coverage area of the initially associated first access point, an access point that belongs to the same access point coordinating cluster as the first access point may forward, to the first access point, the data packet from the internet of things device, and the first access point may reply to the internet of things device with the acknowledgment message through the access point that belongs to the same access point coordinating cluster as the first access, thereby ensuring that the data packet sent in a movement process of the internet of things device can be processed in a timely manner, to avoid data transmission interruption. In addition, after moving out of the coverage area of the first access point, the internet of things device does not need to send a probe request and associate with a new access point. This can reduce signaling overheads and reduce power consumption of the internet of things device, thereby improving a battery life of the internet of things device.

In a possible implementation, signal strength of the data packet received by the second access point is greater than signal strength of the data packet received by each of other access points in the access point coordinating cluster. According to this method, the first access point selects, from the access point coordinating cluster, the second access point whose received data packet has the greatest signal strength; and the second access point assists the first access point in communicating with the internet of things device, thereby ensuring service quality of the internet of things device.

According to a fourth aspect, an embodiment of this application provides an internet of things-based communication method. The method includes: when a first access point determines to send downlink data to an internet of things device, sending, by the first access point, first indication information to a second access point, where the first indication information is used to indicate whether each internet of things device served by an access point coordinating cluster has to-be-received downlink data; receiving, by the first access point from each access point in the access point coordinating cluster, a power saving polling frame and signal strength of the power saving polling frame received by the access point; and then sending, by the first access point, second instruction information to the second access point, where the second instruction information is used to instruct the second access point to send the downlink data to the internet of things device. The access point coordinating cluster includes at least the first access point and the second access point, and the first access point is an access point with which the internet of things device is initially associated. According to this method, after the internet of things device moves out of a coverage area of the initially associated first access point, if the first access point needs to send the downlink data to the internet of things device, the first access point may notify the internet of things device through the second access point that there is to-be-received downlink data, to avoid a problem of data transmission interruption caused because the first access point cannot communicate directly with the internet of things device. In addition, the internet of things device does not need to send a probe request and associate with a new access point. This can reduce signaling overheads and reduce power consumption of the internet of things device, thereby improving a battery life of the internet of things device.

In a possible implementation, signal strength of the power saving polling frame received by the second access point is greater than signal strength of the power saving polling frame received by each of other access points in the access point coordinating cluster.

According to a fifth aspect, an embodiment of this application provides an internet of things-based communication method. The method includes: sending, by an internet of things device, a data packet, where the data packet carries an identifier of an access point coordinating cluster; and then receiving, by the internet of things device, an acknowledgment message from a second access point. The access point coordinating cluster includes at least a first access point and the second access point, and the first access point is an access point with which the internet of things device is initially associated. According to this method, after moving out of a coverage area of the first access point, the internet of things device can still transmit uplink data without sending a probe request and associating with a new access point. This can reduce signaling overheads and reduce power consumption of the internet of things device, thereby improving a battery life.

In a possible implementation, before the receiving, by the internet of things device, an acknowledgment message from a second access point, the internet of things device sends a block acknowledgment request BAR message.

Optionally, the BAR message carries indication information, where the indication information is used to indicate a type of an acknowledgment message requested to be obtained, where the type of an acknowledgment message requested to be obtained may be BA or ACK.

In a possible implementation, the acknowledgment message is a BA message or an ACK message.

According to a sixth aspect, an embodiment of this application provides an internet of things-based communication method. The method includes: receiving, by an internet of things device, indication information from a second access point, where the indication information is used to indicate whether each internet of things device served by an access point coordinating cluster has to-be-received downlink data; sending, by the internet of things device, a power saving polling frame based on the traffic indication information; and receiving, by the internet of things device, an acknowledgment message from the second access point. The access point coordinating cluster includes at least a first access point and the second access point, and the first access point is an access point with which the internet of things device is initially associated. According to this method, after moving out of a coverage area of the first access point, the internet of things device can still receive downlink data sent by the first access point through another access point, without sending a probe request and associating with a new access point. This can reduce signaling overheads and reduce power consumption of the internet of things device, thereby improving a battery life.

According to a seventh aspect, an embodiment of this application provides an apparatus. The apparatus has a function for implementing an action of the second access point in the foregoing method embodiments. The function may be implemented by hardware or by hardware executing corresponding software. The hardware or software includes one or more modules corresponding to the foregoing function. For example, the apparatus may be the second access point or may be a chip in the second access point.

In a possible implementation, the apparatus is the second access point. The second access point includes a processor, and the processor is configured to support the second access point in implementing a corresponding function in the foregoing method. Further, the second access point may include a transmitter and a receiver. The transmitter and the receiver are configured to support the second access point in communicating with an internet of things device and support the second access point in communicating with another access point (for example, a first access point) in a same coordinating cluster as the second access point. Further, the second access point may include a memory, and the memory is configured to be coupled to the processor and stores program instructions and data that are necessary for the second access point.

According to an eighth aspect, an embodiment of this application provides an apparatus. The apparatus has a function for implementing an action of the first access point in the foregoing method embodiments. The function may be implemented by hardware or by hardware executing corresponding software. The hardware or software includes one or more modules corresponding to the foregoing function. For example, the apparatus may be the first access point or may be a chip in the first access point.

In a possible implementation, the apparatus is the first access point. The first access point includes a processor, and the processor is configured to support the first access point in implementing a corresponding function in the foregoing method. Further, the first access point may include a transmitter and a receiver. The transmitter and the receiver are configured to support the first access point in communicating with an internet of things device and support the first access point in communicating with another access point (for example, a second access point) in a same coordinating cluster as the first access point. Further, the first access point may include a memory, and the memory is configured to be coupled to the processor and stores program instructions and data that are necessary for the first access point.

According to a ninth aspect, an embodiment of this application provides an apparatus. The apparatus has a function for implementing an action of the internet of things device in the foregoing method embodiments. The function may be implemented by hardware or by hardware executing corresponding software. The hardware or software includes one or more modules corresponding to the foregoing function. For example, the apparatus may be the internet of things device or may be a chip in the internet of things device.

In a possible implementation, the apparatus is the internet of things device. The internet of things device includes a processor, and the processor is configured to support the internet of things device in implementing a corresponding function in the foregoing method. Further, the internet of things device may include a transmitter and a receiver. The transmitter and the receiver are configured to support the internet of things device in communicating with a first access point, a second access point, and another access point in a coordinating cluster to which the first access point belongs. Further, the internet of things device may include a memory, and the memory is configured to be coupled to the processor and stores program instructions and data that are necessary for the internet of things device.

According to a tenth aspect, an embodiment of this application provides a communications system. The system includes the internet of things device, the first access point, and the second access point according to the foregoing aspects. Optionally, the system may further include another access point that belongs to a same coordinating cluster as the first access point and the second access point.

According to an eleventh aspect, an embodiment of this application provides a computer storage medium, configured to store computer software instructions used by the foregoing second access point. The computer software instructions include a program designed for performing the first aspect and the second aspect.

According to a twelfth aspect, an embodiment of this application provides a computer storage medium, configured to store computer software instructions used by the foregoing first access point. The computer software instructions include a program designed for performing the third aspect and the fourth aspect.

According to a thirteenth aspect, an embodiment of this application provides a computer storage medium, configured to store computer software instructions used by the foregoing internet of things device. The computer software instructions include a program designed for performing the fifth aspect and the sixth aspect.

According to a fourteenth aspect, an embodiment of this application provides a computer program product including instructions. When the computer program product runs on a computer, the computer is enabled to perform the methods according to the first aspect and the second aspect.

According to a fifteenth aspect, an embodiment of this application provides a computer program product including instructions. When the computer program product runs on a computer, the computer is enabled to perform the methods according to the third aspect and the fourth aspect.

According to a sixteenth aspect, an embodiment of this application provides a computer program product including instructions. When the computer program product runs on a computer, the computer is enabled to perform the method according to the fourth aspect.

According to a seventeenth aspect, an embodiment of this application provides a computer program product including instructions. When the computer program product runs on a computer, the computer is enabled to perform the methods according to the fifth aspect and the sixth aspect.

According to an eighteenth aspect, an embodiment of this application provides a chip system, applied to a second access point. The chip system includes at least one processor, memory, and transceiver circuit. The memory, the transceiver circuit, and the at least one processor are interconnected by using a line. The at least one memory stores instructions. When the instructions are executed by the processor, an operation performed by the second access point in the methods according to the first aspect and the second aspect is performed.

According to a nineteenth aspect, an embodiment of this application provides a chip system, applied to a first access point. The chip system includes at least one processor, memory, and transceiver circuit. The memory, the transceiver circuit, and the at least one processor are interconnected by using a line. The at least one memory stores instructions. When the instructions are executed by the processor, an operation performed by the first access point in the methods according to the third aspect and the fourth aspect is performed.

According to a twentieth aspect, an embodiment of this application provides a chip system, applied to an internet of things device. The chip system includes at least one processor, memory, and transceiver circuit. The memory, the transceiver circuit, and the at least one processor are interconnected by using a line. The at least one memory stores instructions. When the instructions are executed by the processor, an operation performed by the internet of things device in the methods according to the fifth aspect and the sixth aspect is performed.

According to the internet of things-based communication method provided in the embodiments of this application, after the internet of things device moves out of the coverage area of the initially associated first access point, the second access point that belongs to the same coordinating cluster as the first access point can reply, in place of the first access point, to the internet of things device with the acknowledgment message; or the second access point may forward, to the first access point, the data packet from the internet of things device, thereby ensuring that the data packet sent in a movement process of the internet of things device can be processed in a timely manner, to avoid data transmission interruption. In addition, after moving out of the coverage area of the first access point, the internet of things device does not need to send a probe request or associate with a new access point. This can reduce signaling overheads and reduce power consumption of the internet of things device, thereby improving a battery life of the internet of things device.

DESCRIPTION OF EMBODIMENTS

The following further describes in detail embodiments of this application with reference to accompanying drawings. A specific operation method in method embodiments may also be applied to an apparatus embodiment or a system embodiment. In the descriptions of this application, unless otherwise stated, "a plurality" means two or more than two.

System architectures and service scenarios described in this application aim to more clearly describe the technical solutions in this application, but are not intended to limit the technical solutions provided in this application. A person of ordinary skill in the art may know that as the system architectures evolve and a new service scenario emerges, the technical solutions provided in this application are applicable to a similar technical problem.

It should be noted that, in this application, the word "example" or "for example" is used to represent giving an example, an illustration, or a description. Any embodiment or design solution described as "example" or "for example" in this application should not be construed as being preferred or advantageous over another embodiment or design solution. Exactly, use of the words such as "example" or "for example" is intended to present a relative concept in a specific manner.

Figure 1:
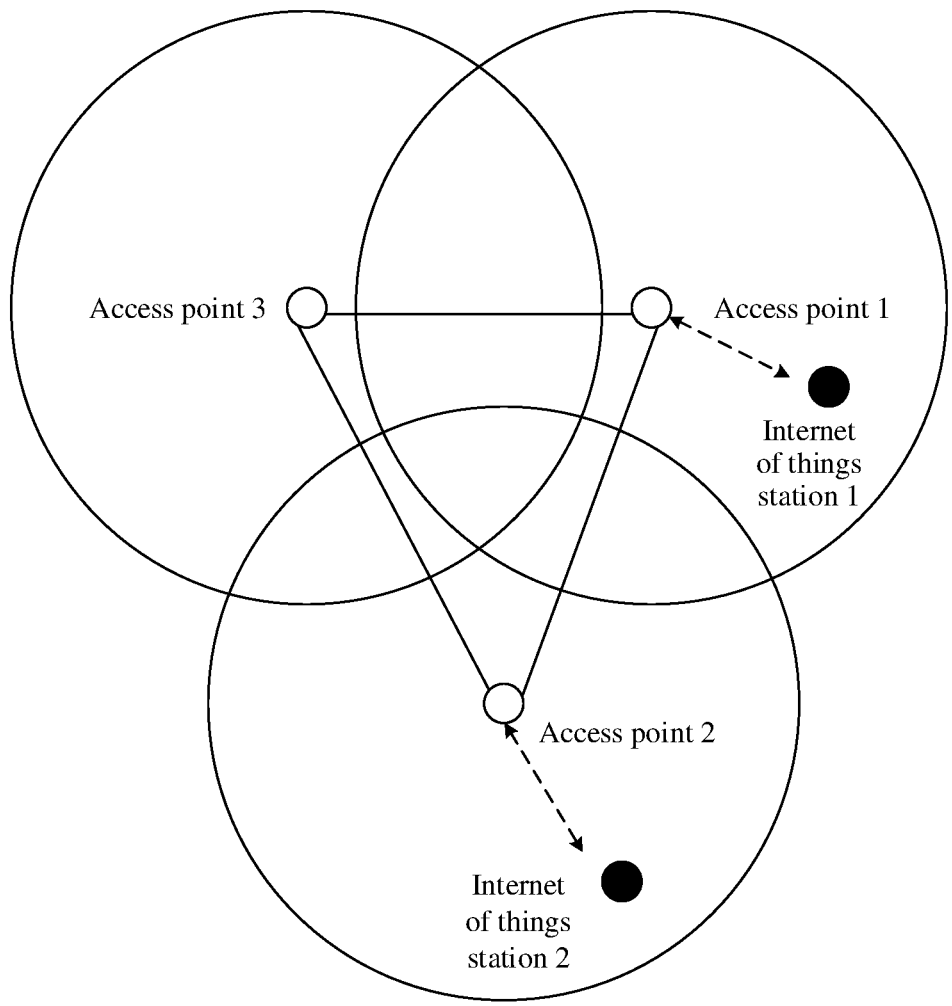
FIG. 1 is a schematic diagram of an example network architecture according to an embodiment of this application.

The embodiments of this application may be applied to an internet of things-based communications system. The communications system includes an access point coordinating cluster and an internet of things device served by the access point coordinating cluster. The access point coordinating cluster includes at least two access points. The access point coordinating cluster serves at least one internet of things device. For example, FIG. 1 is a schematic diagram of a possible communications system according to an embodiment of this application. In the communications system, an AP 1, an AP 2, and an AP 3 belong to a same access point coordinating cluster. An internet of things station (IoT STA) 1 is located in a coverage area of the AP 1, and is an internet of things device associated with the AP 1. An IoT STA 2 is located in a coverage area of the AP 2, and is an internet of things device associated with the AP 2.

Optionally, the APs may communicate with each other in a wired manner, and an AP may communicate with an IoT STA in a wireless manner.

The IoT STA in the present disclosure may also be referred to as an internet of things device, and is a mobile device with a wireless transmission and receiving function. The IoT STA may be deployed indoors or outdoors on land in a handheld or vehicle-mounted manner, may be deployed above water (for example, on a boat), or may be deployed in the air (for example, on an airplane, a balloon, or a satellite). The internet of things device may include various types of devices, for example, user equipment (UE), a mobile phone, a tablet computer, a virtual reality (VR) terminal device, an augmented reality (AR) terminal device, a machine type communication (MTC) terminal device, a terminal device in industrial control, a terminal device in self-driving, a terminal device in telemedicine (remote medical), a terminal device in a smart grid, a terminal device in transportation safety, a terminal device in a smart city, a wearable device (such as a smartwatch, a smart band, and a pedometer), and various types of sensors.

It should be noted that quantities of devices in FIG. 1 are merely examples, and quantities of devices included in a communications system in accordance with embodiments of the present disclosure are not limited thereto.

First, related terms in the present disclosure are explained and described.

An access point coordinating cluster may be referred to as a coordinating cluster for short. One coordinating cluster includes at least two APs. The APs in the same coordinating cluster are allocated with a same coordinating cluster identifier. An AP may belong to different coordinating clusters. When an AP belongs to different coordinating clusters, the AP may be allocated with a plurality of coordinating cluster identifiers, and separately provide, based on the coordinating cluster identifiers, a service to internet of things devices served by different coordinating clusters.

Optionally, a coordinating cluster may have a shared key for communication between an AP in the coordinating cluster and an internet of things device. For example, if an AP needs to decode information from an internet of things device that is not associated with the AP, the AP needs to perform decoding by using the shared key.

It should be noted that when an internet of things device accesses an AP for the first time, the AP may allocate a first identifier to the internet of things device, where the first identifier is used to identify the internet of things device; and map the first identifier to a bitmap, to be used in a subsequent IoT beacon. Then the AP sends, to other APs that belong to a same coordinating cluster as the AP, the first identifier that is mapped to the bitmap and AP information that is associated with the first identifier, so that the other APs update their respective bitmaps.

Then, the AP associated with the internet of things device may allocate a second identifier to the internet of things device based on a requirement of the internet of things device, where the second identifier may be an AP address, a coordinating cluster identifier, or a basic service set color (BSS color) associated with the internet of things device. The following provides descriptions by using an example in which the second identifier is used as a coordinating cluster identifier.

Figure 2:
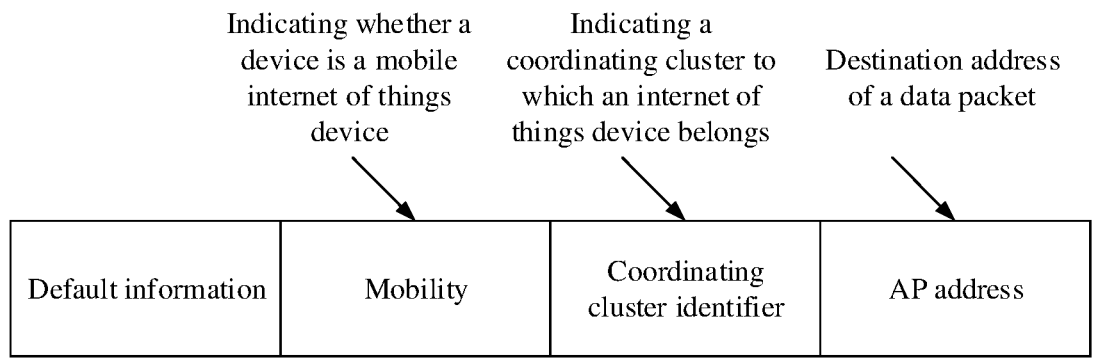
FIG. 2 is an example schematic diagram of a structure of a preamble according to an embodiment of this application.

Optionally, when transmitting a data packet, the internet of things device carries the coordinating cluster ID in a preamble of the data packet, to identify the internet of things device. For example, a structure of the preamble is shown in FIG. 2. The preamble includes default information, mobility; and optionally, may further include the coordinating cluster identifier and the AP address. When the mobility is 1, it indicates that the internet of things device is a mobile internet of things device, and the preamble sent by the internet of things device needs to carry the AP coordinating cluster identifier, used to notify the AP of the coordinating cluster to which the AP belongs. The AP address is a destination AP address of the data packet sent by the internet of things device.

Figure 3:
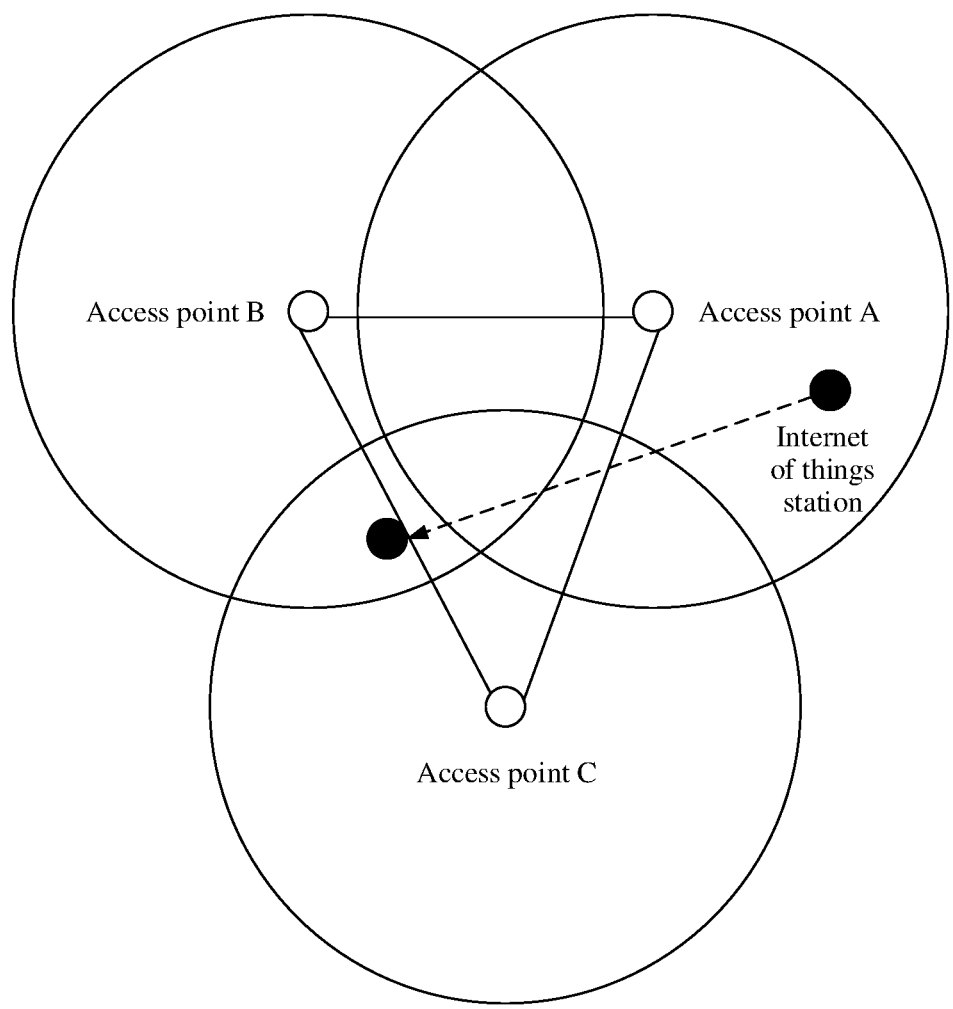
FIG. 3 is an example schematic diagram of an implementation scenario according to an embodiment of this application.

With reference to the foregoing descriptions, in a possible implementation scenario, an internet of things device makes a movement after being associated with an AP, and moves out of a coverage area of the AP. This application provides descriptions by using a scenario shown in FIG. 3 as an example. As shown in FIG. 3, there are an AP A, an AP B, and an AP C in a coordinating cluster. The coordinating cluster may serve an internet of things device shown in FIG. 3. An access point with which the internet of things device is initially associated is a first access point, for example, the AP A in FIG. 3. All access points, in the coordinating cluster other than the first access point, that can receive a data packet sent by the internet of things device may be referred to as second access points. For example, both the AP B and the AP C may be referred to as second access points. FIG. 3 uses an example in which the internet of things device moves to a common coverage area of the AP B and the AP C.

Figure 4:
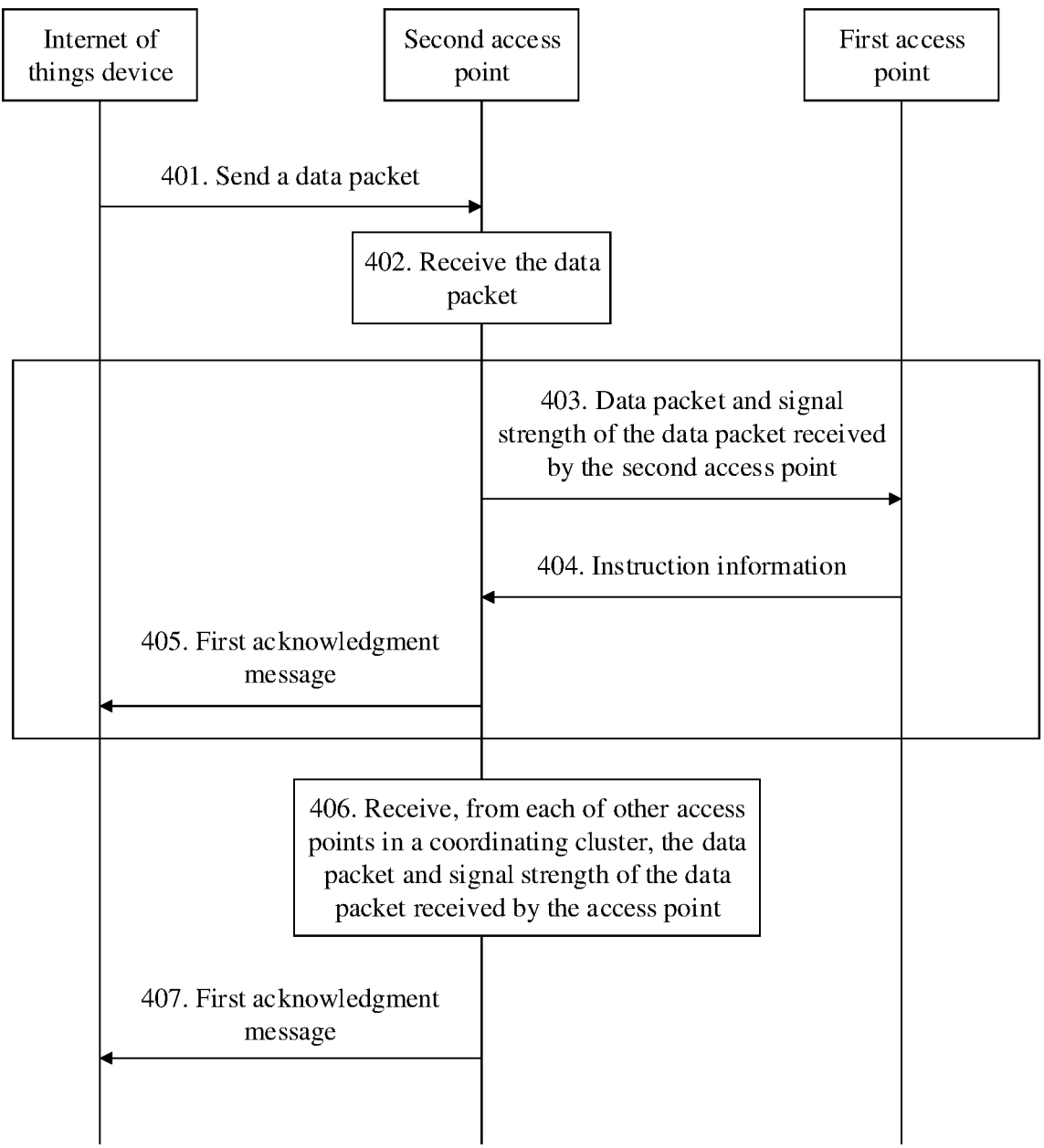
FIG. 4 is a flowchart of an internet of things-based communication method according to an embodiment of this application.

Based on the implementation scenario shown in FIG. 3, an uplink data transmission method according to an embodiment of this application is described. An embodiment of this application provides an internet of things-based communication method. As shown in FIG. 4, the method includes the following steps.

Step 401. An internet of things device sends a data packet.

The data packet carries a coordinating cluster identifier. Optionally, the data packet may further carry a destination address of the data packet, that is, an AP address with which the internet of things device is initially associated.

Step 402. A second access point receives the data packet from the internet of things device.

Optionally, the second access point may be an AP B and an AP C. In other words, both the AP B and the AP C can receive the data packet from the internet of things device. After receiving the data packet, each of the AP B and the AP C may detect whether the coordinating cluster identifier carried in the data packet is the same as its own coordinating cluster identifier. If the coordinating cluster identifiers are the same, subsequent steps are performed.

Optionally, after receiving the data packet from the internet of things device, the second access point may determine whether the data packet is from an internet of things device associated with the second access point. If the data packet is not from the internet of things device associated with the second access point, the second access point determines whether the coordinating cluster identifier in the data packet is consistent with an identifier of a coordinating cluster to which the second access point belongs. If the coordinating cluster identifier in the data packet is consistent with the identifier of the coordinating cluster to which the second access point belongs, two manners of subsequent processing are available. A first processing manner includes step 403 to step 405, and a second processing manner includes step 406 and step 407.

First Processing Manner:

Step 403. The second access point sends, to a first access point, the data packet and signal strength of the data packet received by the second access point. Correspondingly, the first access point receives, from each second access point, the data packet and the signal strength of the data packet received by the second access point.

For example, the signal strength may be a Received Signal Strength Indicator RSSI. After receiving the data packet from the internet of things device, based on an initially associated AP address (that is, an address of the AP A) in the data packet, the AP B may forward the data packet to an AP A and send an RSSI of the data packet received by the AP B to the AP A. Similarly, after receiving the data packet from the internet of things device, based on the initially associated AP address (that is, the address of the AP A) in the data packet, the AP C may forward the data packet to the AP A and send an RSSI of the data packet received by the AP C to the AP A.

It can be understood that the second access point may determine an address of the first access point based on the destination address carried in the data packet; and further send, to the first access point, the data packet and the signal strength of the data packet received by the second access point.

Step 404. The first access point sends instruction information to the second access point. Correspondingly, the second access point receives the instruction information from the first access point.

The instruction information is used to instruct the second access point to send back a first acknowledgment message to the internet of things device. Optionally, the first acknowledgment message is an acknowledgment (ACK) message.

It should be noted that, after receiving the data packet and signal strength from each of the AP B and the AP C, the AP A may compare values of the signal strengths and choose to send instruction information to an AP corresponding to the greatest signal strength. For example, if the AP A receives only the data packets and the signal strengths from the AP B and the AP C, and the signal strength from the AP B is greater than the signal strength from the AP C, the AP A sends the instruction information to the AP B, to instruct the AP B to send a first acknowledgment message to the internet of things device.

Step 405. The second access point sends the first acknowledgment message to the internet of things device.

If the AP A sends the instruction information to the AP B in step 404, the second access point is the AP B in this step.

Second Processing Manner:

Step 406. The second access point receives, from each of other access points in the coordinating cluster, the data packet and signal strength of the data packet received by the access point.

Correspondingly, the second access point may also send the data packet and signal strength of the received data packet to other access points in the coordinating cluster.

Optionally, the second access point may further forward the data packet to a first access point, and other access points in the coordinating cluster that have received the data packet may also forward the data packet to the first access point.

With reference FIG. 3, each of the AP B and the AP C may send the data packet received by itself and an RSSI of the received data packet to the other party, and compare a received RSSI and the RSSI of the data packet received by itself; and if determining that the RSSI of the data packet received by itself is greater than the RSSI of the data packet received by the other access point in the coordinating cluster, send the first acknowledgment message to the internet of things device.

For example, if the AP B determines that the RSSI of the data packet received by the AP C is less than the RSSI of the data packet received by the AP B, the AP B performs step 407, and the AP C does not need to perform step 407.

Step 407. The second access point sends a first acknowledgment message to the internet of things device.

According to the internet of things-based communication method provided in this embodiment of this application, after the internet of things device moves out of a coverage area of the initially associated AP, another AP that belongs to the same coordinating cluster as the originally associated AP may assist the internet of things device in forwarding a data packet to the AP with which the internet of things device is originally associated, thereby ensuring that data transmission interruption does not occur in a movement process of the internet of things device. In addition, the internet of things device does not need to frequently send a probe request and associate with a new AP. This can reduce signaling overheads and reduce power consumption of the internet of things device.

Optionally, in an uplink data transmission process provided in this embodiment of this application, after an AP receives the data packet from the internet of things device, there are two response manners.

In a first manner, the AP needs to reply with an ACK for each received data packet. For example, in the foregoing step 405 or step 407, the second access point needs to reply to the internet of things device with an ACK.

In a second manner, after receiving the data packet, the AP does not reply with an acknowledgment message instantly, but replies to the internet of things device with a block acknowledgment (BA) message or an ACK message after receiving a block acknowledgment request (BAR) message from the internet of things device. Optionally, the internet of things device may send the BAR message based on a specified delay.

Optionally, if the second manner is used, in the foregoing step 401, the data packet sent by the internet of things device further carries instruction information for instructing an AP to make a response by using a BAR mechanism. After determining, based on the data packet, that the internet of things device requests to be responded by using the BAR mechanism, the second access point does not send the first acknowledgment message to the internet of things device instantly; and when the internet of things device needs to obtain the first acknowledgment message, the second access point sends a BAR message, where the BAR message carries indication information, the indication information is used to indicate a type of an acknowledgment message requested to be obtained, and the type of an acknowledgment message requested to be obtained is ACK or BA. It can be understood that when the second manner is used, the second access point can perform step 405 or step 407 only when receiving the BAR message. If the type of an acknowledgment message requested to be obtained is ACK, the first acknowledgment message is an ACK message. If the type of an acknowledgment message requested to be obtained is BA, the first acknowledgment message is a BA message.

Optionally, the BAR mechanism may be applied to the method process shown in FIG. 4, or may be independent of the method process shown in FIG. 4. It can be understood that regardless of whether there is an access point coordinating cluster in a communications system, after receiving a data packet from an internet of things device, an AP may not reply to the internet of things device with an ACK message instantly, and the AP replies to the internet of things device with an ACK message or a BA message based on indication information in a BAR message after receiving the BAR message from the internet of things device. For example, with reference FIG. 1, the AP 1 is associated with an internet of things device 1. The AP 1 does not reply with an ACK message instantly after receiving a data packet sent by the internet of things device 1. When the internet of things device 1 needs to obtain an ACK message, the internet of things device 1 may send a BAR message to the AP 1, where indication information carried in the BAR message is used to indicate that a type of an acknowledgment message requested to be obtained is ACK, so that the AP sends an ACK message to the internet of things device.

Figures 5, 6:
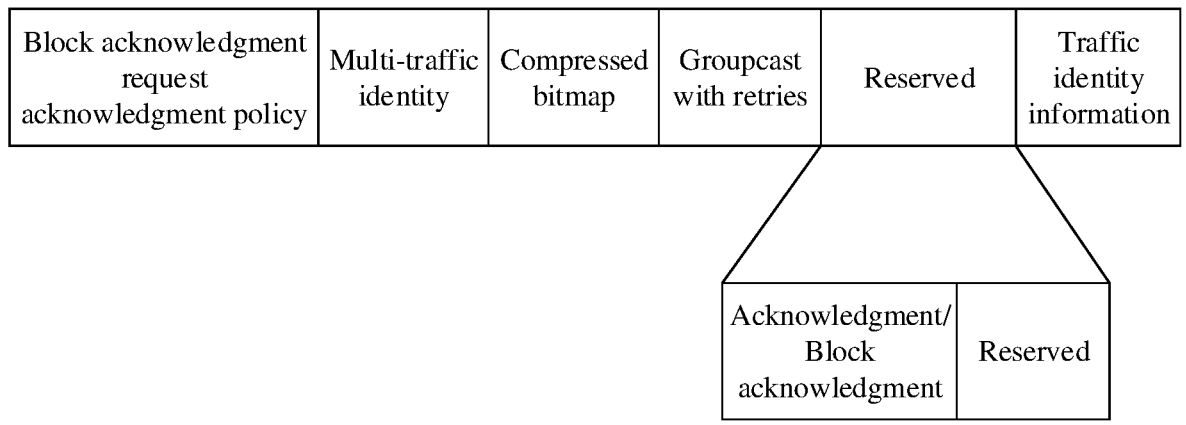
FIG. 5 is an example schematic diagram of a BAR frame structure according to an embodiment of this application.
FIG. 6 is an example schematic diagram of a specific field in a BAR frame structure according to an embodiment of this application.

It should be noted that a BAR message sent by an internet of things device to an AP is used to request to obtain acknowledgment messages (that is, a BA) for a plurality of data packets at one time. If the internet of things device sends only one data packet, the BAR message is used to request to obtain an acknowledgment message (that is, an ACK) for the one data packet. Therefore, the BAR message further needs to carry the indication information used to indicate that a type of an acknowledgment message requested to be obtained is ACK or BA. In this application, the type of an acknowledgment message requested to be obtained is indicated by modifying a frame structure of the BAR message. FIG. 5 is a schematic diagram of a BAR frame structure according to an embodiment of the present disclosure.

A BAR frame structure includes the following fields: frame control, duration, receiving node address (receiver address, RA), transmitting node address (transmitter address, TA), block acknowledgment request control (BAR control), block acknowledgment request information (BAR information), and frame check sequence (FCS).

In an embodiment, a reserved field in BAR control in the BAR frame structure may be used to indicate a type of an acknowledgment message requested to be obtained. As shown in FIG. 6, BAR control includes a block acknowledgment request acknowledgment policy (BAR Ack Policy) field, a multi-traffic identity (Multi-TID) field, a compressed bitmap field, a groupcast with retries (group-cast retry, GCR) field, a reserved field, and traffic identity information (TID_INFO). Referring to FIG. 6, a part of a reserved field in FIG. 6 may be used to indicate whether a type of an acknowledgment message requested to be obtained is ACK or BA.

Alternatively, one of reserved field combinations of a multi-TID subfield value, a compressed Bitmap subfield value, and a GCR subfield value in BAR Control may be used to indicate a type of an acknowledgment message requested to be obtained, as shown in Table 1. The type of an acknowledgment message requested to be obtained may be indicated by using a combined value of three reserved fields in Table 1.

TABLE 1

| Multi-TID subfield value | Compressed Bitmap subfield value | GCR subfield value | Block Ack Req frame variant |
|---|---|---|---|
| 0 | 0 | 1 | reserved |
| 1 | 0 | 1 | reserved |
| 1 | 1 | 1 | reserved |

Figure 7:
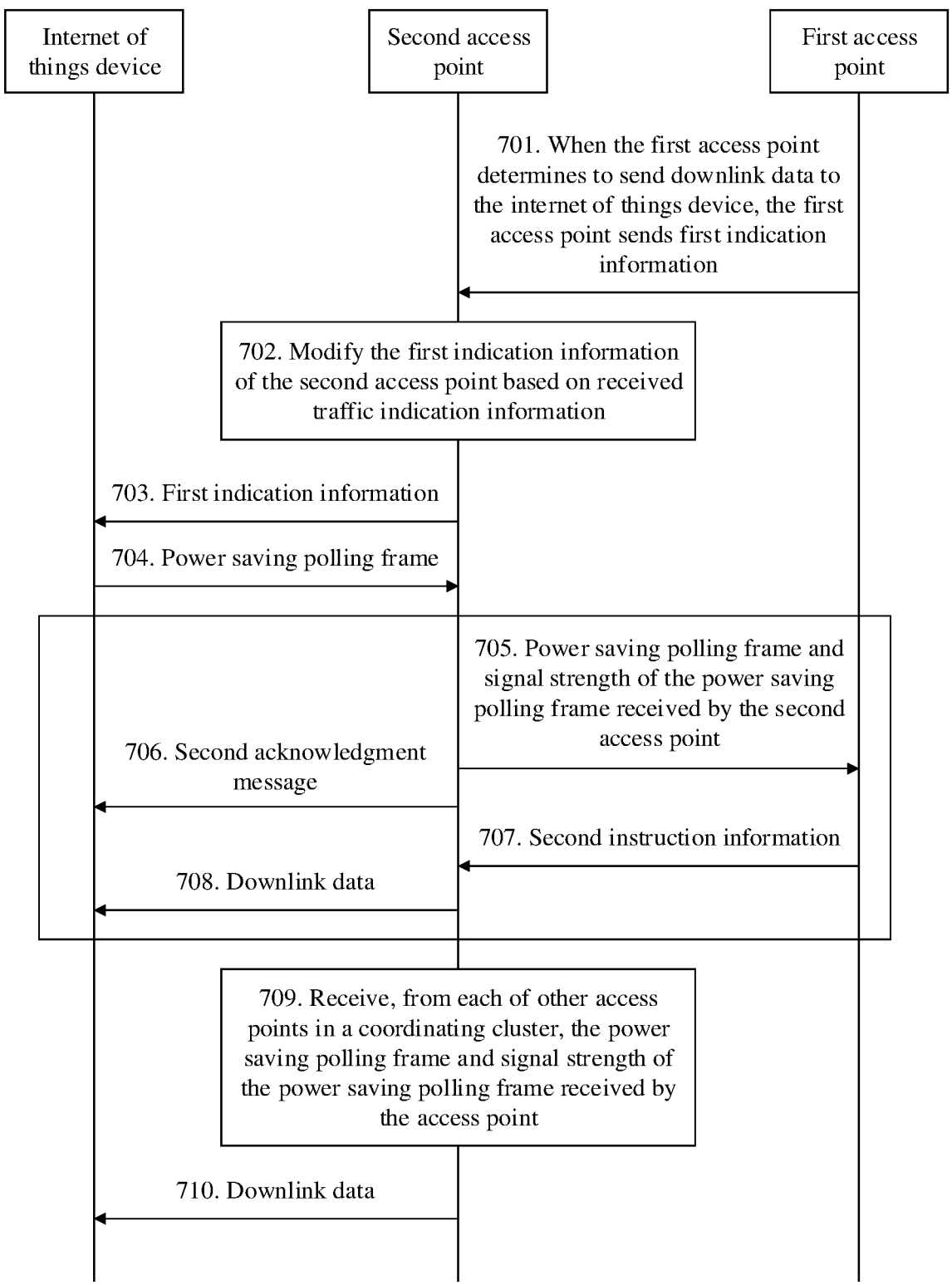
FIG. 7 is a flowchart of another internet of things-based communication method according to an embodiment of this application.

The foregoing describes the uplink data transmission method in the implementation scenario shown in FIG. 3. In another possible implementation, with reference to the implementation scenario shown in FIG. 3, a downlink data transmission method in an embodiment of this application is described. As shown in FIG. 7, the method includes the following steps.

Step 701. When a first access point determines to send downlink data to an internet of things device, the first access point sends first indication information to a second access point. Correspondingly, the second access point receives the first indication information.

The first access point may be the AP A in FIG. 3, and the second access point is the AP B and the AP C in FIG. 3.

Optionally, before step 701, APs in a coordinating cluster need to exchange downlink traffic information, and each AP in the coordinating cluster stores first indication information.

The first indication information may also be referred to as traffic indication information. The traffic indication information is used to indicate whether each internet of things device served by the coordinating cluster has to-be-received downlink data. In other words, the traffic indication information is used to indicate whether an internet of things device associated with each AP in the coordinating cluster has to-be-received downlink data.

Optionally, the traffic indication information may be a traffic indication bitmap (TIM). The traffic indication information may be set based on Association Identifier (AID) space. For example, the traffic indication information includes an indication start bit, a length, and indication content. The indication start bit is used to represent an internet of things device from which indication starts. For example, if the indication start bit is 10, it represents that indication starts from the 10th internet of things device in the coordinating cluster. The length is used to represent a quantity of indicated internet of things devices. If the length is 3, it represents that whether there is to-be-received downlink data needs to be indicated for three internet of things devices. The indication content is used to indicate whether the internet of things devices have to-be-received downlink data.

For example, the indication content in the traffic indication information is shown in Table 2. It should be noted that Table 2 is only an example indication form of the traffic indication information. A specific indication form of the traffic indication information is not limited in embodiments of the present disclosure.

TABLE 2

| Identifier of an internet of things device | A | B | C |
|---|---|---|---|
| Whether there is to-be-received downlink data | 1 | 0 | 0 |

In the table, "0" represents that there is to-be-received downlink data, and "1" represents that there is no to-be-received downlink data.

It can be understood that when each AP in the coordinating cluster does not need to send downlink data to an associated internet of things device, in the traffic indication information stored in each AP, identifiers of all internet of things devices correspond to "0". When the first access point needs to send downlink data to an associated internet of things device, the first access point changes "0" corresponding to an identifier of the internet of things device in the traffic indication information to "1"; and then sends updated traffic indication information to the second access point.

For example, with reference to FIG. 3, the first access point is the AP A. Assuming that an identifier of an internet of things device associated with the AP A is A, the AP A updates traffic indication information to the traffic indication information shown in Table 2, and then sends the updated traffic indication information to the AP B and the AP C.

Optionally, if the first access point sends the updated traffic indication information, step 702 further needs to be performed.

Step 702. The second access point modifies traffic indication information of the second access point based on the received first indication information.

Optionally, after receiving the traffic indication information from the first access point, the second access point may determine whether the received traffic indication information is consistent with the traffic indication information of the second access point. If the received traffic indication information is inconsistent with the traffic indication information of the second access point, the second access point modifies the traffic indication information of the second access point based on the received traffic indication information.

For example, with reference to FIG. 3, both the AP B and the AP C can receive the traffic indication information from the AP A, and then modify their respective traffic indication information to the traffic indication information shown in Table 2.

Step 703. The second access point sends the first indication information to the internet of things device. Correspondingly, the internet of things device receives the first indication information.

For example, in step 702, both the AP B and AP C have changed "0" corresponding to the internet of things device A associated with the AP A to "1" in their respective traffic indication information. In this step, the AP B and AP C each send the traffic indication information to the internet of things device A. It can be understood that the traffic indication information sent by the AP B to the internet of things device A is updated traffic indication information of the AP B, and the traffic indication information sent by the AP C to the internet of things device A is also updated traffic indication information of the AP C.

Step 704. The internet of things device sends a power saving polling frame. Correspondingly, the second access point receives the power saving polling frame.

Optionally, the power saving polling frame may be referred to a PS-Poll frame for short. The power saving polling frame may carry a coordinating cluster identifier and an address of an AP with which the internet of things device is initially associated.

With reference to FIG. 3, the internet of things device is located in a common coverage area of the AP B and the AP C. Therefore, both the AP B and the AP C can receive the power saving polling frame.

Optionally, after the second access point receives the power saving polling frame from the internet of things device, two processing manners are available. A first processing manner includes step 705 to step 708, and a second processing manner includes step 709 and 710.

First Processing Manner:

Step 705. The second access point sends, to the first access point, the power saving polling frame and signal strength of the power saving polling frame received by the second access point. Correspondingly, the first access point receives, from each second access point, the power saving polling frame and the signal strength of the power saving polling frame received by the second access point.

For example, the signal strength may be an RSSI. After receiving the power saving polling frame from the internet of things device, based on an initially associated AP address (that is, an address of the AP A) in the power saving polling frame, each of the AP B and the AP C may forward the power saving polling frame to the AP A and send an RSSI of the power saving polling frame received by itself to the AP A.

Step 706. The second access point sends a second acknowledgment message to the internet of things device. Correspondingly, the internet of things device receives the second acknowledgment message.

Optionally, the AP B and the AP C each send a second acknowledgment message to the internet of things device in FIG. 3, where the second acknowledgment message is used to notify the internet of things device that the AP has received the power saving polling frame.

It should be noted that an execution sequence of step 705 and step 706 is not limited in embodiments of the present disclosure.

Step 707. The first access point sends second instruction information to the second access point. Correspondingly, the second access point receives the second instruction information from the first access point.

The second instruction information is used to instruct the second access point to send the downlink data to the internet of things device.

It should be noted that, after receiving the power saving polling frame and signal strength from each of the AP B and the AP C, the AP A may compare values of the signal strengths and choose to send second instruction information to an AP corresponding to the greatest signal strength. For example, if the AP A receives only the power saving polling frames and the signal strengths from the AP B and the AP C, and the signal strength from the AP B is greater than the signal strength from the AP C, the AP A sends the second instruction information to the AP B, to instruct the AP B to assist the AP A in transmitting the downlink data.

Step 708. The second access point sends the downlink data to the internet of things device.

It can be understood that, with reference to the description in step 707, in this case, the second access point is the AP B, and the AP A may send, to the AP B, the downlink data that needs to be sent to the internet of things device, so that the AP B forwards the downlink data.

Second Processing Manner:

Step 709. The second access point receives, from each of other access points in the coordinating cluster, the power saving polling frame and signal strength of the power saving polling frame received by the access point.

Correspondingly, the second access point may also send, to other access points in the coordinating cluster, the power saving polling frame received by the second access point and signal strength of the received power saving polling frame.

With reference to FIG. 3, each of the AP B and the AP C may send the power saving polling frame received by itself and signal strength of the received power saving polling frame to the other party, and compare a received signal strength and the signal strength of the power saving polling frame received by itself; and if determining that the signal strength of the power saving polling frame received by itself is greater than the signal strength of the power saving polling frame received by the other access point in the coordinating cluster, send the downlink data to the internet of things device.

For example, if the AP B determines that the signal strength of the power saving polling frame received by the AP C is less than the signal strength of the power saving polling frame received by the AP B, the AP B performs step 710, and the AP C does not need to perform step 710.

Step 710. The second access point sends the downlink data to the internet of things device.

It can be understood that with reference to the example in step 709, the second access point is the AP B in this step.

According to the internet of things-based communication method provided in this embodiment, after the internet of things device moves out of a coverage area of the originally associated AP, another AP that belongs to the same coordinating cluster as the originally associated AP may assist the AP with which the internet of things device is originally associated in transmitting the downlink data to the internet of things device, thereby ensuring that data transmission interruption does not occur in a movement process of the internet of things device. In addition, the internet of things device does not need to frequently send a probe request and associate with a new AP. This can reduce signaling overheads and reduce power consumption of the internet of things device.

Figure 8:
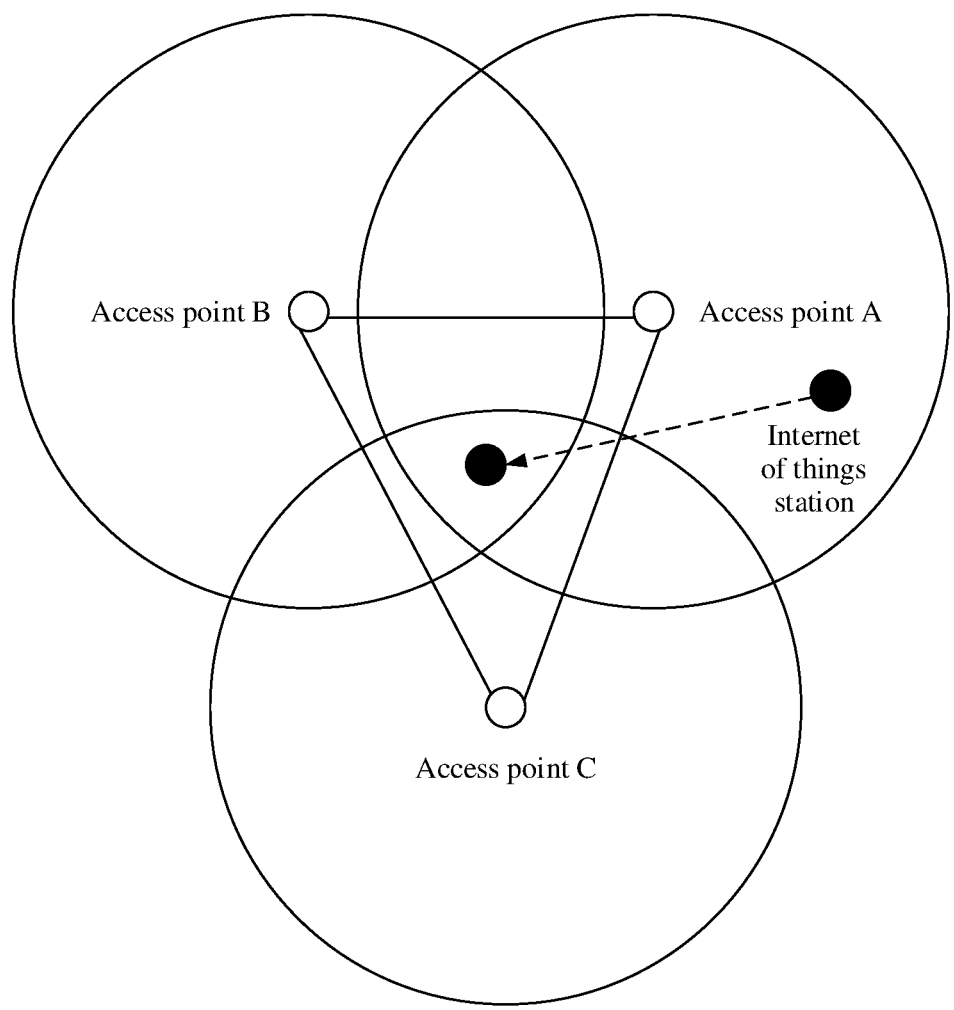
FIG. 8 is an example schematic diagram of another implementation scenario according to an embodiment of this application.

Optionally, the embodiments of this application may further be applied to another possible implementation scenario, in which an internet of things device makes a movement after being associated with an AP but does not move out of a coverage area of the AP. Descriptions are provided by using a scenario shown in FIG. 8 as an example. As shown in FIG. 8, there are an AP A, an AP B, and an AP C in a coordinating cluster. The coordinating cluster may serve an internet of things device shown in FIG. 8. An access point with which the internet of things device is initially associated is a first access point, for example, the AP A in FIG. 8. All access points, in the coordinating cluster, except the first access point, that can receive a data packet sent by the internet of things device may be referred to as second access points. For example, both the AP B and the AP C may be referred to as second access points. FIG. 8 uses an example in which the internet of things device moves to a common coverage area of the AP A, the AP B, and the AP C.

Figure 9:
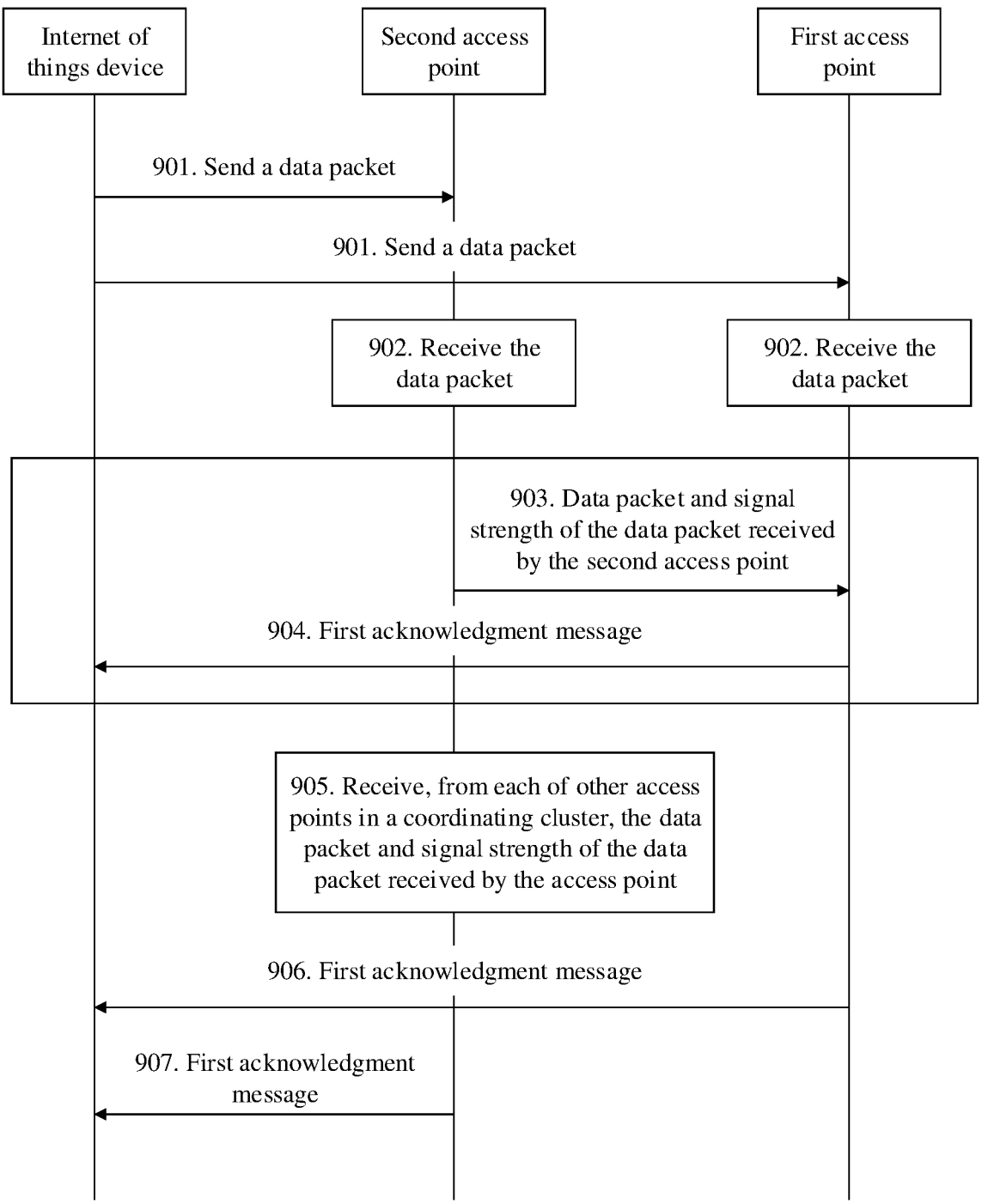
FIG. 9 is a flowchart of another internet of things-based communication method according to an embodiment of this application.

Based on the implementation scenario shown in FIG. 8, an uplink data transmission method according to an embodiment of this application is described. As shown in FIG. 9, the method includes the following steps.

Step 901. An internet of things device sends a data packet.

The data packet carries a coordinating cluster identifier. Optionally, the data packet may further carry an AP address with which the internet of things device is initially associated.

Step 902. A first access point and a second access point receive the data packet from the internet of things device.

It can be understood that because the internet of things device does not move out of a coverage area of the first access point, the first access point may also receive the data packet from the internet of things device.

Optionally, the second access point may be an AP B and an AP C. In other words, both the AP B and the AP C can receive the data packet from the internet of things device. After receiving the data packet, each of the AP B and the AP C may detect whether the coordinating cluster identifier carried in the data packet is the same as its own coordinating cluster identifier. If the coordinating cluster identifiers are the same, subsequent steps are performed.

Optionally, after the second access point receives the data packet from the internet of things device, two processing manners are available. A first processing manner includes step 903 and step 904, and a second processing manner includes step 905 to step 907.

First Processing Manner:

Step 903. The second access point sends, to the first access point, the data packet and signal strength of the data packet received by the second access point. Correspondingly, the first access point receives, from each second access point, the data packet and the signal strength of the data packet received by the second access point.

For example, the signal strength may be an RSSI. After receiving the data packet from the internet of things device, based on an initially associated AP address (that is, an address of the AP A) in the data packet, each of the AP B and the AP C may forward the data packet to an AP A and send an RSSI of the data packet received by itself to the AP A.

Step 904. The first access point sends a first acknowledgment message to the internet of things device. Correspondingly, the internet of things device receives the first acknowledgment message.

It should be noted that with reference to FIG. 8, because the internet of things device is still located in a coverage area of the AP A, after receiving the data packet from the internet of things device or receiving the data packet from the other APs in the coordinating cluster, the AP A may still reply to the internet of things device with a first acknowledgment message. Optionally, the first acknowledgment message is an ACK message.

Optionally, the AP A may further compare a value of signal strength of the data packet received by the AP A with value of the signal strength of the data packet received by each of the AP B and the AP C. If the data packet received by the AP A has the greatest signal strength, the AP A sends the first acknowledgment message to the internet of things device. If the data packet received by the AP B has the greatest signal strength, the AP A instructs the AP B to send the first acknowledgment message to the internet of things device, to ensure communication quality of the internet of things device.

Second Processing Manner:

Step 905. The second access point receives, from each of other access points in the coordinating cluster, the data packet and signal strength of the data packet received by the access point.

Correspondingly, the second access point may also send the data packet and signal strength of the received data packet to other access points in the coordinating cluster.

With reference FIG. 8, each of the AP A, the AP B, and the AP C may send the data packet received by itself and an RSSI of the received data packet to another party, and compare received RSSIs and the RSSI of the data packet received by itself; and if determining that the RSSI of the data packet received by itself is greater than the RSSIs of the data packet received by the other access points in the coordinating cluster, send the first acknowledgment message to the internet of things device.

For example, if the AP A determines that the data packet received by the AP A has the greatest signal strength, the AP A sends the first acknowledgment message to the internet of things device, that is, performs step 906;

if the AP B determines that the data packet received by the AP B has the greatest signal strength, the AP B sends the first acknowledgment message to the internet of things device, that is, the AP B functions as the second access point and performs step 907; or if the AP C determines that the data packet received by the AP C has the greatest signal strength, the AP C sends the first acknowledgment message to the internet of things device, that is, the AP C functions as the second access point and performs step 907.

Step 906. The first access point sends a first acknowledgment message to the internet of things device.

Step 907. The second access point sends a first acknowledgment message to the internet of things device.

According to the internet of things-based communication method provided in this embodiment of this application, when the internet of things device makes a movement but does not move out of a coverage area of an originally associated AP, the AP with which the internet of things device is originally associated may still communicate with the internet of things device directly; or the AP may select, from the coordinating cluster, another AP with the greatest signal strength of the data packet received from the internet of things device, for communicating with the internet of things device. This ensures communication quality of the internet of things device in a movement process.

Optionally, with reference to the implementation scenario shown in FIG. 8, in another implementation of the embodiments of this application, an internet of things device may add, to a data packet sent to a first access point, instruction information for instructing the AP to make a response by using a BAR mechanism. After receiving the data packet, the first access point does not reply with an ACK message immediately. After the first access point receives a BAR message from the internet of things device, if indication information carried in the BAR message indicates that a type of an acknowledgment message requested to be obtained is ACK, the first access point then replies to the internet of things device with an ACK message. Alternatively, if the indication information carried in the BAR message indicates that the type of an acknowledgment message requested to be obtained is BA, the first access point then replies to the internet of things device with a BA message.

Alternatively, with reference to FIG. 9, when determining to reply to the internet of things device with an acknowledgment message, the first access point or the second access point may defer the reply, and reply to the internet of things device with a BA message or an ACK message based on a BAR message after receiving the BAR message.

Figure 10:
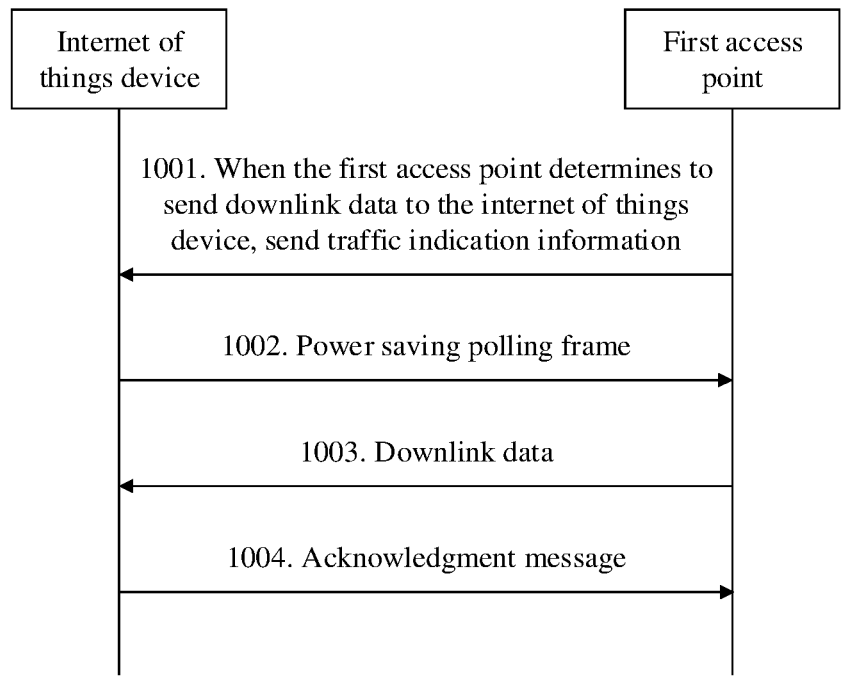
FIG. 10 is a flowchart of another internet of things-based communication method according to an embodiment of this application.

In another possible implementation, with reference to the implementation scenario shown in FIG. 8, a downlink data transmission method according to an embodiment of this application is described. As shown in FIG. 10, the method includes the following steps.

Step 1001. When a first access point determines to send downlink data to an internet of things device, the first access point sends traffic indication information to the internet of things device. Correspondingly, the internet of things device receives the traffic indication information from the first access point.

The first access point is an access point associated with the internet of things device. For example, the first access point may be the APA in FIG. 8.

The traffic indication information in this step is the same as the traffic indication information in step 701. For details, refer to related descriptions in step 701.

Step 1002. The internet of things device sends a power saving polling frame to the first access point. Correspondingly, the first access point receives the power saving polling frame from the internet of things device.

Step 1003. The first access point sends the downlink data to the internet of things device. Correspondingly, the internet of things device receives the downlink data from the first access point.

Step 1004. The internet of things device sends an ACK message to the first access point.

The foregoing mainly describes the solutions in the embodiments of this application from the perspective of interaction between an access point and an internet of things device. It can be understood that, to implement the foregoing functions, the access point and the internet of things device each include a corresponding hardware structure and/or software module for performing each function. With reference to the units and algorithm steps described in the embodiments disclosed in this application, embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, the access point and the internet of things device may be divided into functional units based on the foregoing method examples.

For example, each functional unit may be obtained through division based on a corresponding function, or two or more functions may be integrated into one processing unit. The integrated unit may be implemented in a form of hardware, or may be implemented in a form of a software functional unit. It should be noted that the unit division in the embodiments of this application is an example, and is merely logical function division. There may be another division manner during actual implementation.

Figure 11:
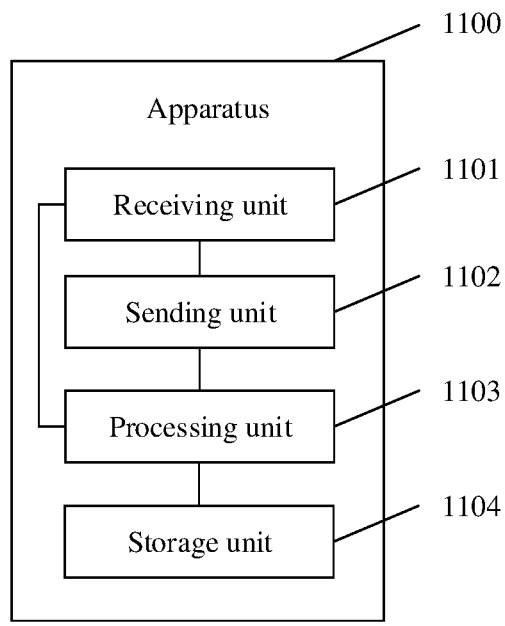
FIG. 11 is a schematic structural diagram of an apparatus according to an embodiment of this application.

When each functional module is obtained through division based on each corresponding function, FIG. 11 is a schematic block diagram of an apparatus according to an embodiment of the present invention. The apparatus may exist in the form of software, an access network device, or a chip in an access network device. The apparatus 1100 includes a receiving unit 1101, a sending unit 1102, and a processing unit 1103.

In a possible implementation, the apparatus 1100 may be the first access point described above or a chip in the first access point. The receiving unit 1101 is configured to support the apparatus 1100 in performing step 403 in FIG. 4, step 705 in FIG. 7, steps 901, 902, and 903 in FIG. 9, and steps 1002 and 1004 in FIG. 10. The sending unit 1102 is configured to support the apparatus 1100 in performing step 404 in FIG. 4, steps 701 and 707 in FIG. 7, steps 904 and 906 in FIG. 9, and steps 1001 and 1003 in FIG. 10. The processing unit 1103 may support the apparatus 1100 in performing an action completed by the first access point in the foregoing method example.

In a possible implementation, the apparatus 1100 may be the second access network device described above or a chip in the second access network device. The receiving unit 1101 is configured to support the apparatus 1100 in performing steps 401, 402, 404, and 406 in FIG. 4, steps 701, 704, and 709 in FIG. 7, and steps 901, 902, and 905 in FIG. 9. The sending unit 1102 is configured to support the apparatus 1100 in performing steps 403, 405, and 407 in FIG. 4, and steps 703, 705, 706, 708, and 710 in FIG. 7. The processing unit 1103 may support the apparatus 1100 in performing an action completed by the second access point in the foregoing method example, for example, step 702 in FIG. 7.

Optionally, the apparatus 1100 may further include a storage unit 1104, configured to store program code and data of the apparatus 1100.

All related content of the steps in the foregoing method embodiment may be referenced in a function description of a corresponding functional module.

The processing unit 1103 may be a processor or a controller, such as a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processing unit 1103 may implement or execute various example logical blocks, modules, and circuits described with reference to content disclosed in the present invention. Alternatively, the processing unit may be a combination of processors implementing the computing function, for example, a combination of one or more microprocessors or a combination of a DSP and a microprocessor. The receiving unit 1101 and the sending unit 1102 may be communications interfaces, where the communications interfaces are general terms. During specific implementations, the communications interfaces may include a plurality of interfaces. For example, if the apparatus 1100 is the first access point, the communications interface may include an interface between the first access point and another access point in a same coordinating cluster, an interface between the first access point and an internet of things device, and/or another interface. For another example, if the apparatus 1100 is the second access point, the communications interface may include an interface between the second access point and another access point in a same coordinating cluster, an interface between the second access point and an internet of things device, and/or another interface. The storage unit 1104 may be a memory.

Figure 12:
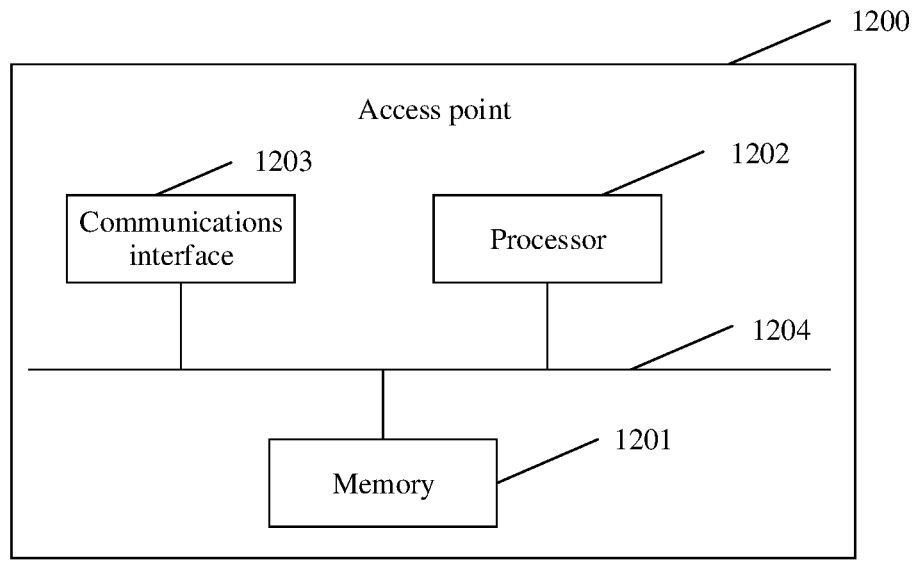
FIG. 12 is a schematic structural diagram of an access point according to an embodiment of this application.

If the processing unit 1103 is a processor, the receiving unit 1101 and the sending unit 1102 are communications interfaces, and the storage unit 1104 is a memory, the structure of the apparatus 1100 in the embodiment of this application may be a structure of the access point shown in FIG. 12.

FIG. 12 is a possible schematic structural diagram of an access point according to an embodiment of this application.

As shown in FIG. 12, the access point 1200 includes a processor 1202, a communications interface 1203, and a memory 1201. Optionally, the access point 1200 may further include a bus 1204. The communications interface 1203, the processor 1202, and the memory 1201 are connected to each other by using the bus 1204. The bus 1204 may be a PCI bus, an EISA bus, and the like. The bus 1204 may be classified into an address bus, a data bus, a control bus, and the like. For ease of representation, only one thick line is used to represent the bus in FIG. 12, but this does not mean that there is only one bus or only one type of bus.

The access point in FIG. 12 may be the first access point or the second access point described above.

Figure 13:
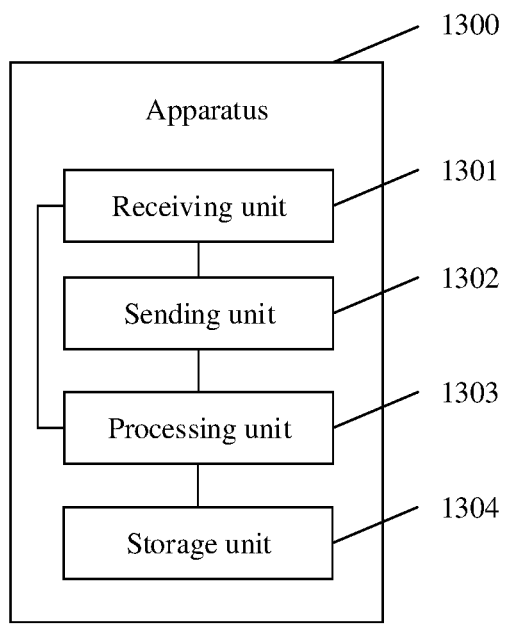
FIG. 13 is a schematic structural diagram of another apparatus according to an embodiment of this application.

When each functional module is obtained through division based on each corresponding function, FIG. 13 is a schematic block diagram of an apparatus according to an embodiment of the present invention. The apparatus may exist in the form of software, an internet of things device, or a chip in an internet of things device. The apparatus 1300 includes a receiving unit 1301, a sending unit 1302, and a processing unit 1303.

The receiving unit 1301 is configured to support the apparatus 1300 in performing steps 405 and 407 in FIG. 4, steps 703, 706, 708, and 710 in FIG. 7, steps 904, 906, and 907 in FIG. 9, and steps 1001 and 1003 in FIG. 10. The sending unit 1302 is configured to support the apparatus 1300 in performing step 401 in FIG. 4, step 704 in FIG. 7, step 901 in FIG. 9, and steps 1002 and 1004 in FIG. 10. The processing unit 1304 may support the apparatus 1300 in performing an action completed by the internet of things device in the foregoing method example.

Optionally, the apparatus 1300 may further include a storage unit 1304, configured to store program code and data of the apparatus 1300.

All related content of the steps in the foregoing method embodiments may be referenced in a function description of a corresponding functional module.

The processing unit 1303 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing unit 1303 may implement or execute various example logical blocks, modules, and circuits described with reference to content disclosed in the present invention. Alternatively, the processor may be a combination implementing a computing function, for example, a combination of one or more microprocessors, or a combination of a DSP and a microprocessor. The receiving unit 1301 and the sending unit 1302 may be communications interfaces, where the communications interfaces are general terms. In specific implementation, the communications interfaces may include a plurality of interfaces. For example, the communications interface may include an interface between the internet of things device and the first access point, an interface between the internet of things device and the second access point, and/or another interface. The storage unit 1304 may be a memory.

Figure 14:
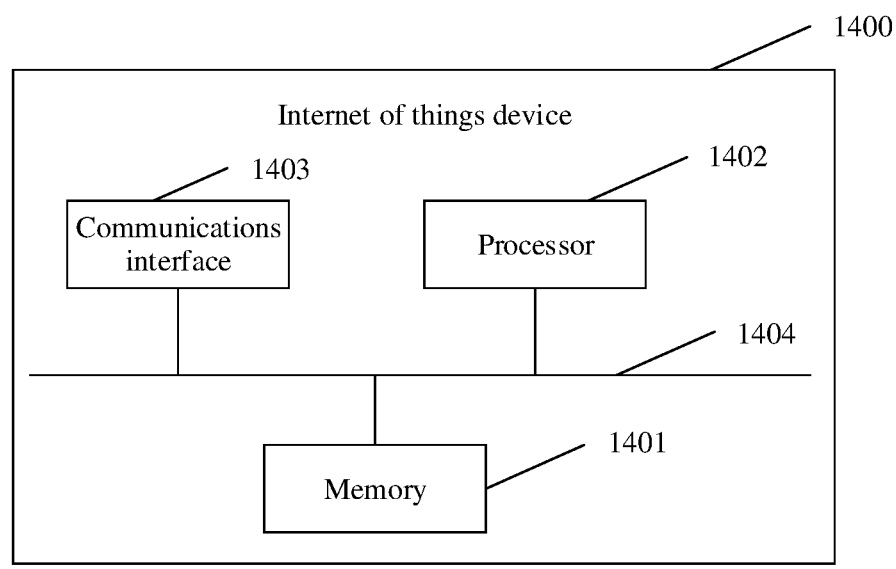
FIG. 14 is a schematic structural diagram of an internet of things device according to an embodiment of this application.

If the processing unit 1303 is a processor, the receiving unit 1301 and the sending unit 1302 are communications interfaces, and the storage unit 1304 is a memory, the structure of the apparatus 1300 in this embodiment of this application may be a structure of the internet of things device shown in FIG. 14.

FIG. 14 is a possible schematic structural diagram of an internet of things device according to an embodiment of this application.

As shown in FIG. 14, the internet of things device 1400 includes a processor 1402, a communications interface 1403, and a memory 1401. Optionally, the access point 1400 may further include a bus 1404. The communications interface 1403, the processor 1402, and the memory 1401 are connected to each other by using the bus 1404. The bus 1404 may be a PCI bus, an EISA bus, and the like. The bus 1404 may be classified into an address bus, a data bus, a control bus, and the like. For ease of representation, only one thick line is used to represent the bus in FIG. 14, but this does not mean that there is only one bus or only one type of bus.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, a read-only memory (ROM), an erasable programmable read-only memory (EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network device or a terminal. Certainly, the processor and the storage medium may exist in the core network device or the terminal as discrete components.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions of the embodiments.

In addition, functional units in the embodiments of the present invention may be integrated into one processing unit, or each of the functional units may exist independently, or two or more units are integrated into one unit. The integrated unit may be implemented in a form of hardware, or may be implemented in a form of hardware in addition to a software functional unit.

Based on the foregoing descriptions of the implementations, a person skilled in the art may clearly understand that this application may be implemented by software in addition to necessary universal hardware or by hardware only. In most circumstances, the former is a preferred implementation. Based on such an understanding, the technical solutions of this application essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A communications apparatus applied to a second access point, comprising:
   a receiver, configured to receive a data packet from an internet of things device, wherein the data packet carries an identifier identifying an access point coordinating cluster, the access point coordinating cluster comprises a plurality of access points including at least a first access point and the second access point, and the internet of things device is initially associated with the first access point; and
   a transmitter, configured to: send an acknowledgment message to the internet of things device; or send, to the first access point, the data packet and signal strength of the data packet received by the receiver from the internet of things device,
   wherein the communications apparatus further comprises at least one processor configured to:
   determine whether the identifier in the data packet is in consistent with the identifier of the access point coordinating cluster including the second access point, and
   after determination that the identifier in the data packet is in consistent with the identifier of the access point coordinating cluster, send the acknowledgment message to the internet of things device, or send the data packet and the signal strength of the data packet to the first access point.

2. The communications apparatus according to claim 1, wherein
   the receiver is further configured to receive the data packet from each of other access points in the access point coordinating cluster and signal strength of the data packet received by the respective access point, the other access points being access points in the plurality of access points other than the second access point.

3. A communications apparatus applied to a second access point, comprising:
  a receiver, configured to receive a data packet from an internet of things device, wherein the data packet carries an identifier identifying an access point coordinating cluster, the access point coordinating duster comprises a plurality of access points including at least a first access point and the second access point, and the internet of things device is initially associated with the first access point; and
  a transmitter, configured to: send an acknowledgment message to the internet of things device, or send, to the first access point, the data packet and signal strength of the data packet received by the receiver from the internet of things device,
  wherein the receiver is further configured to receive the data packet from each of other access points in the access point coordinating cluster and signal strength of the data packet received by the respective access point, the other access points being access points in the plurality of access points other than the second access point,
  wherein the communications apparatus further comprises at least one processor configured to:
  determine whether the signal strength of the data packet received by the receiver from the internet of things device is greater than the signal strength of the data packet received by each of the other access points in the access point coordinating cluster; and
  in response to the determination that the signal strength of the data packet received by the receiver from the internet of things device is greater than the signal strength of the data packet received by each of the other access points in the access point coordinating cluster, send the acknowledgment message to the internet of things device.

4. The communications apparatus according to claim 1, wherein
  the receiver is further configured to receive instruction information from the first access point, wherein the instruction information instructs the second access point to send back the acknowledgment message; and
  the transmitter is further configured to send the acknowledgment message to the internet of things device.

5. A communications apparatus applied to a second access point, comprising:
  a receiver, configured to receive first indication information from a first access point, wherein the first indication information indicates whether each internet of things device served by an access point coordinating cluster has to-be-received downlink data, the access point coordinating cluster comprises a plurality of access points including at least the first access point and the second access point, and the internet of things device is initially associated with the first access point; and
  a transmitter, configured to send the first indication information received by the receiver to the internet of things device.

6. The communications apparatus according to claim 5, wherein
  the receiver is further configured to receive a power saving polling frame from the internet of things device; and
  the transmitter is further configured to send, to the first access point, the power saving polling frame and signal strength of the power saving polling frame received by the receiver; and send an acknowledgment message to the internet of things device.

7. The communications apparatus according to claim 6, wherein
  the receiver is configured to receive second instruction information from the first access point, wherein the second instruction information instructs the transmitter to send downlink data to the internet of things device.

8. A communications apparatus applied to a first access point in an access point coordinating cluster including a plurality of access points, comprising:
  a receiver, configured to receive, from each of the plurality of access points in the access point coordinating cluster other than the first access point, a data packet and signal strength of the data packet received by the respective access point, wherein the plurality of access points comprise at least the first access point and a second access point, and an internet of things device is initially associated with the first access point; and
  a transmitter is configured to send instruction information to the second access point, wherein the instruction information instructs the second access point to send back an acknowledgment message to the internet of things device.

9. The communications apparatus according to claim 8, wherein signal strength of the data packet received by the second access point is greater than the signal strength of the data packet received by each of the other access points in the plurality of access points.

10. The communications apparatus according to claim 1, wherein the data packet further comprises a destination address indicating an address of the first access point.

11. The communications apparatus according to claim 1, wherein the at least one processor is further configured to:
  determine whether the internet of things device is not associated with the second access point;
  in response to determination that the internet of things device is not associated with the second access point, determine whether the identifier in the data packet is in consistent with the identifier of the access point coordinating cluster including the second access point, and
  in response to determination that the identifier in the data packet is in consistent with the identifier of the access point coordinating cluster, send the acknowledgment message to the internet of things device, or send the data packet and the signal strength of the data packet to the first access point.

12. The communications apparatus according to claim 1, wherein the transmitter is further configured to: send the acknowledgment message to the internet of things device after the receiver receives a block acknowledgment request (BAR) message from the internet of things device.

13. The communications apparatus according to claim 1, wherein the access point coordinating cluster has a shared key for communications between each access point in the access point coordinating cluster and the internet of things device.

14. The communications apparatus according to claim 8, wherein the transmitter is further configured to: send the acknowledgment message to the internet of things device after the receiver receives a block acknowledgment request message from the internet of things device.

15. The communications apparatus according to claim 8, wherein the access point coordinating cluster has a shared key for communications between each access point in the access point coordinating cluster and the internet of things device.

16. The communications apparatus according to claim 8, further comprising at least one processor configured to:
- determine whether the signal strength of the data packet received by the second access point is greater than the signal strength of the data packet received by each of the other access points in the access point coordinating cluster; and
- in response to determination that the signal strength of the data packet received by the second access point is greater than the signal strength of the data packet received by each of the other access points in the access point coordinating cluster, send the instruction information to the second access point.

17. The communications apparatus according to claim 1, wherein the transmitter is further configured to send the acknowledgment message to the internet of things device after a pre-defined period of delay.

18. The communications apparatus according to claim 12, wherein the BAR message instructs the second access point to send the acknowledgment message to the internet of things device to acknowledge receipt of a plurality of received data packets including the data packet at one time.

19. The communications apparatus according to claim 18, wherein the BAR message comprises fields indicating frame control, a duration, a receiver address, a transmitter address, block acknowledgment request control, block acknowledgment request information, and a frame check sequence, and the block acknowledgment request control indicates a type of an acknowledgment message requested to be obtained.

20. The communications apparatus according to claim 19, wherein the block acknowledgment request control includes a block acknowledgment request acknowledgment policy field, a multi-traffic identity field, a compressed bitmap field, a group cast with retries field, a reserved field, and traffic identity information.

* * * * *

UNITED STATES PATENT AND TRADEMARK OFFICE
CERTIFICATE OF CORRECTION

| | |
|---|---|
| PATENT NO. | : 11,316,630 B2 |
| APPLICATION NO. | : 17/007424 |
| DATED | : April 26, 2022 |
| INVENTOR(S) | : Yuchen Guo |

It is certified that error appears in the above-identified patent and that said Letters Patent is hereby corrected as shown below:

In the Claims

Claim 3, at Column 25, Line 8, replace "duster" with "cluster".

Signed and Sealed this
Twenty-fourth Day of May, 2022

Katherine Kelly Vidal
*Director of the United States Patent and Trademark Office*